United States Patent
Chui (10) Patent No.: US 7,550,912 B2
(45) Date of Patent: Jun. 23, 2009

(54) METHOD AND SYSTEM FOR MAINTAINING PARTIAL VACUUM IN DISPLAY DEVICE

(75) Inventor: Clarence Chui, San Mateo, CA (US)

(73) Assignee: IDC, LLC, San Francisco, CA (US)

( * ) Notice: Subject to any disclaimer, the term of this patent is extended or adjusted under 35 U.S.C. 154(b) by 598 days.

(21) Appl. No.: 11/183,049

(22) Filed: Jul. 15, 2005

(65) Prior Publication Data

US 2006/0067647 A1      Mar. 30, 2006

Related U.S. Application Data

(60) Provisional application No. 60/613,502, filed on Sep. 27, 2004.

(51) Int. Cl.
*H01J 1/62*       (2006.01)
(52) U.S. Cl. .................... 313/495; 313/496; 313/497
(58) Field of Classification Search .......... 313/495–497
See application file for complete search history.

(56) References Cited

U.S. PATENT DOCUMENTS

| | | | |
|---|---|---|---|
| 3,586,926 | A | 6/1971 | Nakamura et al. |
| 4,977,009 | A | 12/1990 | Anderson et al. |
| 5,550,373 | A | 8/1996 | Cole et al. |
| 5,559,358 | A | 9/1996 | Burns et al. |
| 5,610,438 | A | 3/1997 | Wallace et al. |
| 5,936,758 | A | 8/1999 | Fisher et al. |
| 5,939,785 | A | 8/1999 | Klonis et al. |
| 5,986,796 | A | 11/1999 | Miles |
| 6,040,937 | A | 3/2000 | Miles |
| 6,226,890 | B1 | 5/2001 | Boroson et al. |
| 6,284,342 | B1 * | 9/2001 | Ebisawa et al. ............. 428/69 |
| 6,379,988 | B1 | 4/2002 | Peterson et al. |

(Continued)

FOREIGN PATENT DOCUMENTS

EP          0 667 548          8/1995

(Continued)

OTHER PUBLICATIONS

Miles, M.W., Jan. 18, 2003, Interferometric modulation: MOEMS as an enabling technology for high-performance reflective displays, *Proceedings of the Spie*, Bellingham, VA. US., pp. 131-139:XP002324563.

(Continued)

*Primary Examiner*—Vip Patel
(74) *Attorney, Agent, or Firm*—Knobbe, Martens, Olson & Bear LLP (57) ABSTRACT

The time required for an interferometric modulator to switch from a state with a collapsed cavity to a state with an open cavity or vice versa, i.e., the switch time, is decreased by decreasing the viscosity of the gas filling the cavity. The viscosity is decreased by forming at least a partial vacuum in the cavity. The partial vacuum is formed, in turn, by forming a cavity in a housing holding the interferometric modulator. The vacuum can be generated by a vacuum pump. By decreasing the switch time, interferometric modulators in an array of interferometric modulators can be switched more quickly, thereby advantageously increasing the refresh rate for a display using the array.

23 Claims, 10 Drawing Sheets

U.S. PATENT DOCUMENTS

| | | | |
|---|---|---|---|
| 6,392,144 | B1 | 5/2002 | Filter et al. |
| 6,472,739 | B1 | 10/2002 | Wood et al. |
| 6,474,138 | B1 | 11/2002 | Chang et al. |
| 6,551,838 | B2 | 4/2003 | Santini et al. |
| 6,590,157 | B2 | 7/2003 | Boroson et al. |
| 6,661,084 | B1 | 12/2003 | Peterson et al. |
| 6,674,159 | B1 | 1/2004 | Peterson et al. |
| 6,674,562 | B1 | 1/2004 | Miles et al. |
| 6,696,645 | B2 | 2/2004 | Margomenos et al. |
| 6,740,145 | B2 | 5/2004 | Boroson et al. |
| 6,787,897 | B2 | 9/2004 | Geefay et al. |
| 6,876,071 | B2 | 4/2005 | Liu et al. |
| 7,060,895 | B2 | 6/2006 | Kothari et al. |
| 7,123,216 | B1 | 10/2006 | Miles |
| 7,161,094 | B2 | 1/2007 | Kothari et al. |
| 2002/0024711 | A1 | 2/2002 | Miles |
| 2002/0075551 | A1 | 6/2002 | Daneman |
| 2002/0126364 | A1 | 9/2002 | Miles |
| 2003/0054588 | A1 | 3/2003 | Patel et al. |
| 2003/0062186 | A1 | 4/2003 | Boroson et al. |
| 2003/0075794 | A1 | 4/2003 | Felton et al. |
| 2003/0108306 | A1 | 6/2003 | Whitney et al. |
| 2004/0061492 | A1 | 4/2004 | Lopes et al. |
| 2004/0080035 | A1 | 4/2004 | Delapierre |
| 2004/0100677 | A1 | 5/2004 | Huibers et al. |
| 2004/0140557 | A1 | 7/2004 | Sun et al. |
| 2004/0184133 | A1 | 9/2004 | Su et al. |
| 2005/0074919 | A1 | 4/2005 | Patel et al. |
| 2005/0253283 | A1 | 11/2005 | DCamp et al. |
| 2006/0066935 | A1 | 3/2006 | Cummings et al. |

FOREIGN PATENT DOCUMENTS

| | | |
|---|---|---|
| EP | 1418154 A2 | 5/2004 |
| JP | 02-068513 | 3/1990 |
| JP | 03-199920 | 8/1991 |
| WO | WO 99/52006 | 10/1999 |
| WO | WO03026369 A1 | 3/2003 |
| WO | WO 03/056367 | 7/2003 |

OTHER PUBLICATIONS

International Search Report for PCT/US2005/030134, Dec. 19, 2005.

IPRP for PCT/US05/030134 filed Aug. 24, 2005.

Official Communication in European App. No. 05789959.3 dated Jun. 25, 2007.

Liang, Zhi-Hao et al., "A Low Temperature Wafer-Level Hermetic MEMS Package Using UV Curable Adhesive", Electronic Components and Technology Conference, 2004 IEEE, pp. 1486-1491.

Moraja, et al., Advanced Getter Solutions at Wafter Level to Assure High Reliability to the last Generations MEMS, IEEE Reliability Physics Symposium Proceedings, 2003, pp. 458-459.

Sparks, et al. Chip-Level Vacuum Packaging of Micromachines Using NanoGetters, IEEE Transactions on Advanced Packaging, vol. 26 Issue 3, Aug. 2003. pp. 277-282.

EP Search Report for EP patent No. 05255700.6-2217.

International Search Report and Written Opinion for PCT/US05/013463.

* cited by examiner

METHOD AND SYSTEM FOR MAINTAINING PARTIAL VACUUM IN DISPLAY DEVICE

RELATED APPLICATIONS

This application claims priority to U.S. Provisional Application No. 60/613,502, filed Sep. 27, 2004. The content of the aforementioned application is hereby incorporated by reference in its entirety.

BACKGROUND

1. Field

The field of the invention relates to microelectromechanical systems (MEMS) and the packaging of such systems. More specifically, the field of the invention relates to a method and system of maintaining a partial vacuum in a display device, such as a MEMS device 2. Description of the Related Technology Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices. The embodiments described herein provide a package structure and a method of manufacturing a package structure in ambient conditions.

An embodiment provides a method of fabricating a display device. A transparent substrate is provided. The transparent substrate has an interferometric modulator formed thereon. The interferometric modulator is configured to modulate light transmitted through the transparent substrate. A backplate is joined to the transparent substrate to form a package, which encapsulates the interferometric modulator. Gas pressure within the package is reduced.

According to another embodiment, a microelectromechanical systems device is provided. The device comprises a transparent substrate, an interferometric modulator formed on the transparent substrate, a backplate sealed to the transparent substrate to form a package having a cavity with at least a partial vacuum. The device may also include a vacuum housing configured to hold the package. The housing may configured to be connected to a vacuum device. The interferometric modulator is configured to modulate light transmitted through the transparent substrate.

According to yet another embodiment, a method of fabricating a display device is provided. A panel is provided; the panel comprises a substrate joined to a backplate, wherein the substrate has an interferometric modulator formed thereon and encapsulated within the panel. The interferometric modulator is configured to modulate light transmitted through the substrate. Gas pressure within the panel is reduced.

In accordance with another embodiment, a display device is provided. The display device comprises a substrate configured to transmit light therethrough, a modulating means for modulating light transmitted through the substrate, a backplate sealed to the substrate to form a package. The modulating means has a cavity therein. The cavity has a gas pressure less than atmospheric pressure. The display device may also include a vacuum housing configured to hold the package. The modulating means is formed on the substrate. The housing may be configured to be connected to a vacuum device.

BRIEF DESCRIPTION OF THE DRAWINGS

These and other aspects of the invention will be readily apparent from the following description and from the appended drawings (not to scale), which are meant to illustrate and not to limit the invention, and wherein.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One embodiment of the invention is a system and method for increasing the performance of a MEMS device. In this embodiment, the performance of the device is increased by decreasing the time required for the device to switch from one state to another. In one embodiment, the device is an interferometric modulator having a collapsible cavity. This embodiment of the interferometric modulator is configured to switch between a collapsed cavity state and an open cavity state, and the switch time is decreased by decreasing the viscosity of the gas filling the collapsible cavity. In one embodiment, the viscosity is decreased by forming at least a partial vacuum in the cavity. By decreasing the switch time, interferometric modulators in a modulator array can be switched more quickly, thereby advantageously increasing the refresh rate for a display device using the array, as will be described in more detail below.

Figure 1:
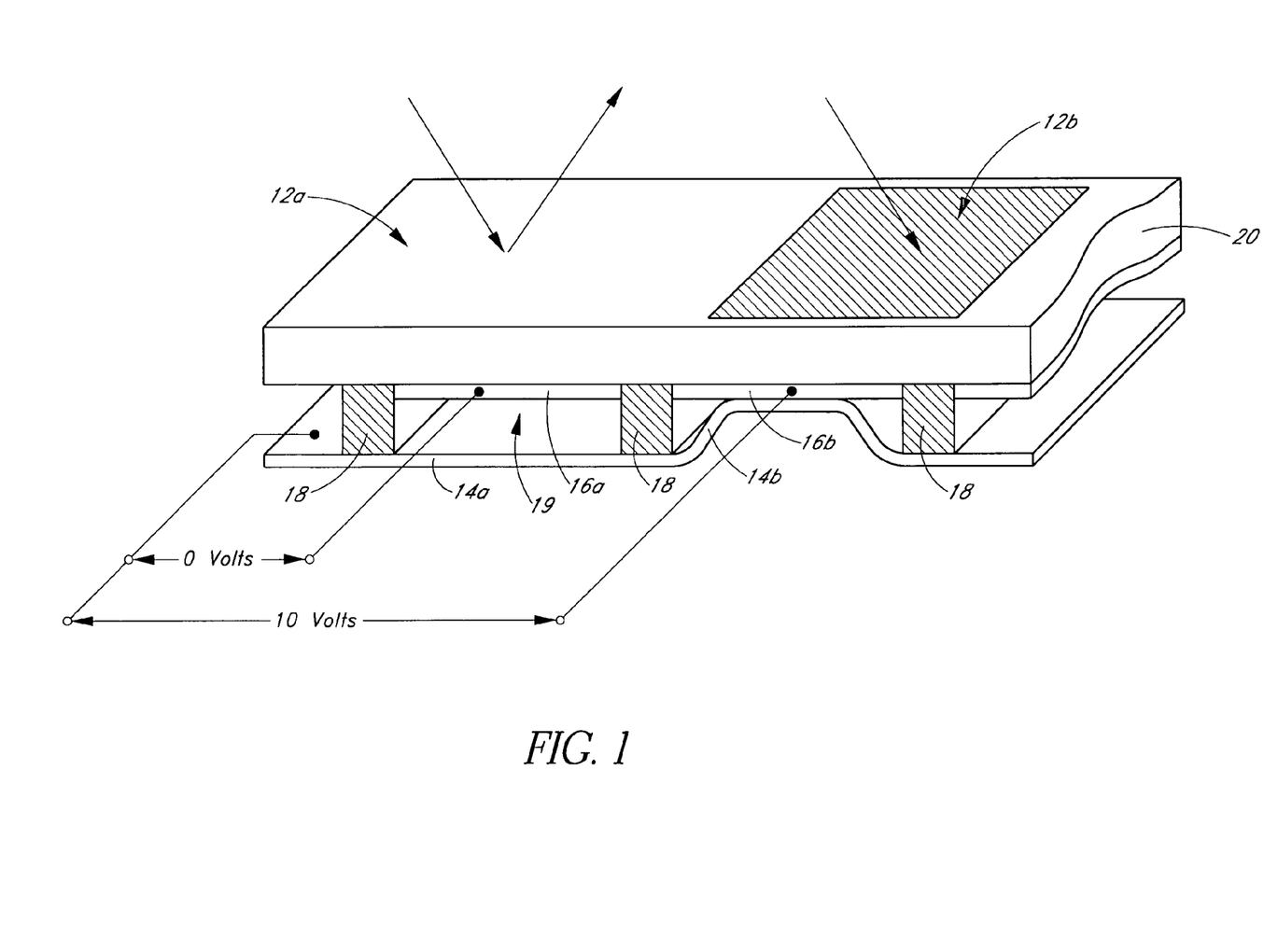
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
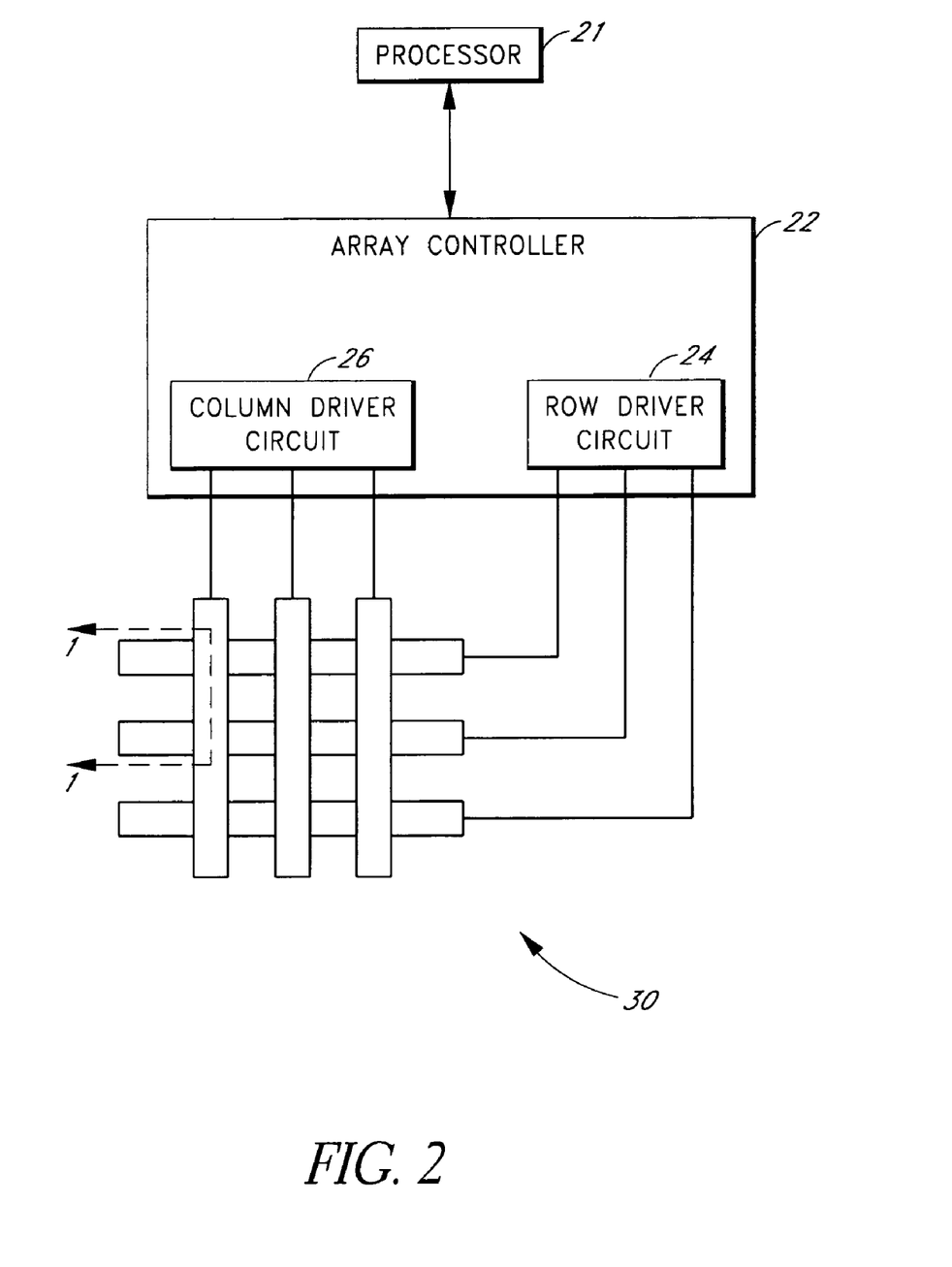
FIG. 2 is a system block diagram illustrating one embodiment of an electronic device incorporating a 3×3 interferometric modulator display.
Figure 3:
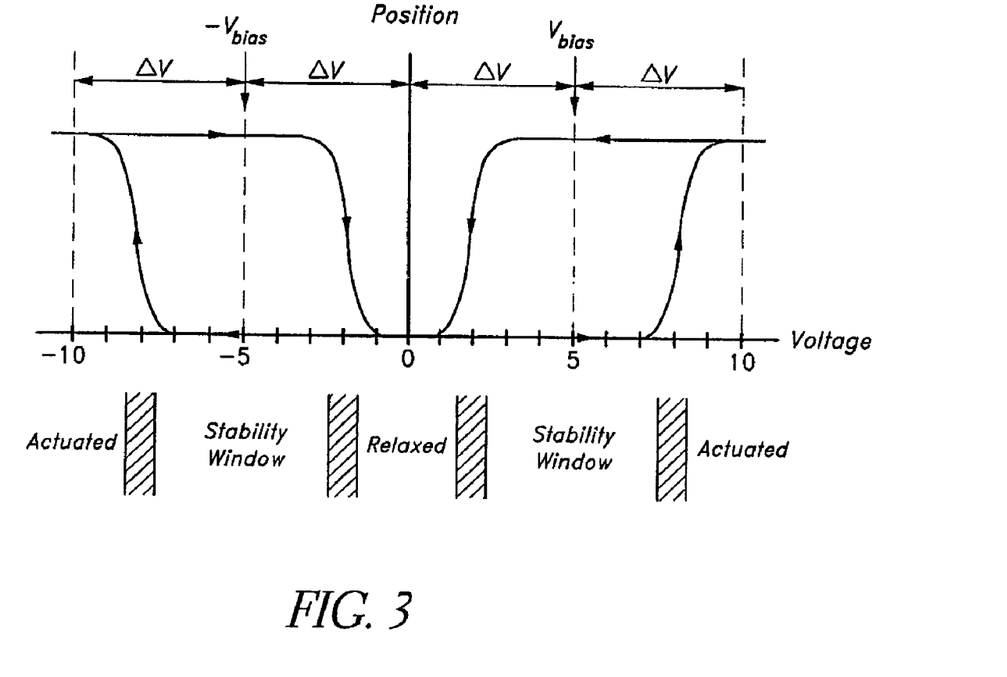
FIG. 3 is a diagram of movable mirror position versus applied voltage for one exemplary embodiment of an interferometric modulator of FIG. 1.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figure 4:
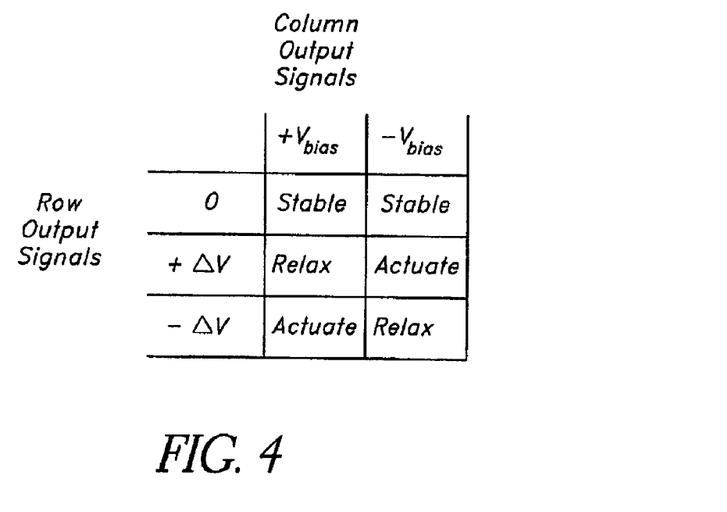
FIG. 4 is an illustration of a set of row and column voltages that may be used to drive an interferometric modulator display.
Figure 5A:
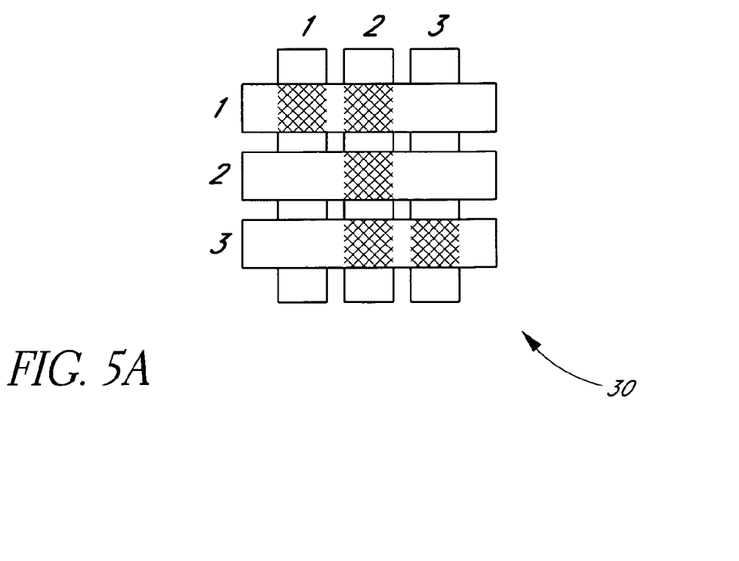
FIGS. 5A and 5B illustrate one exemplary timing diagram for row and column signals that may be used to write a frame of display data to the 3×3 interferometric modulator display of FIG. 2.
Figure 5B:
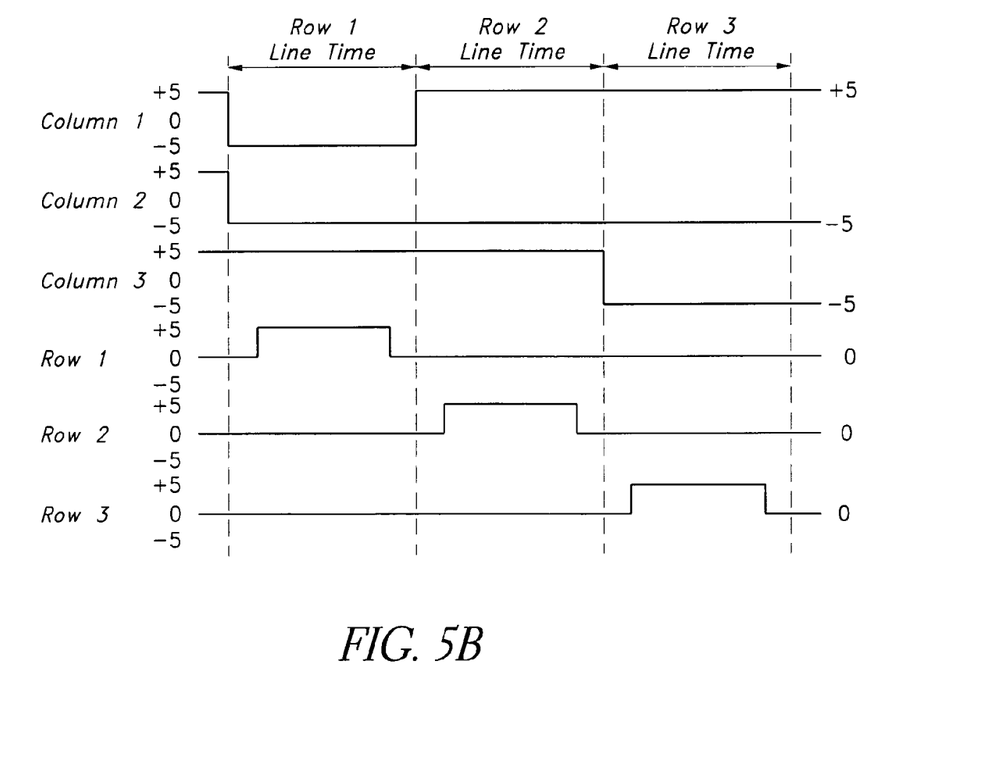

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
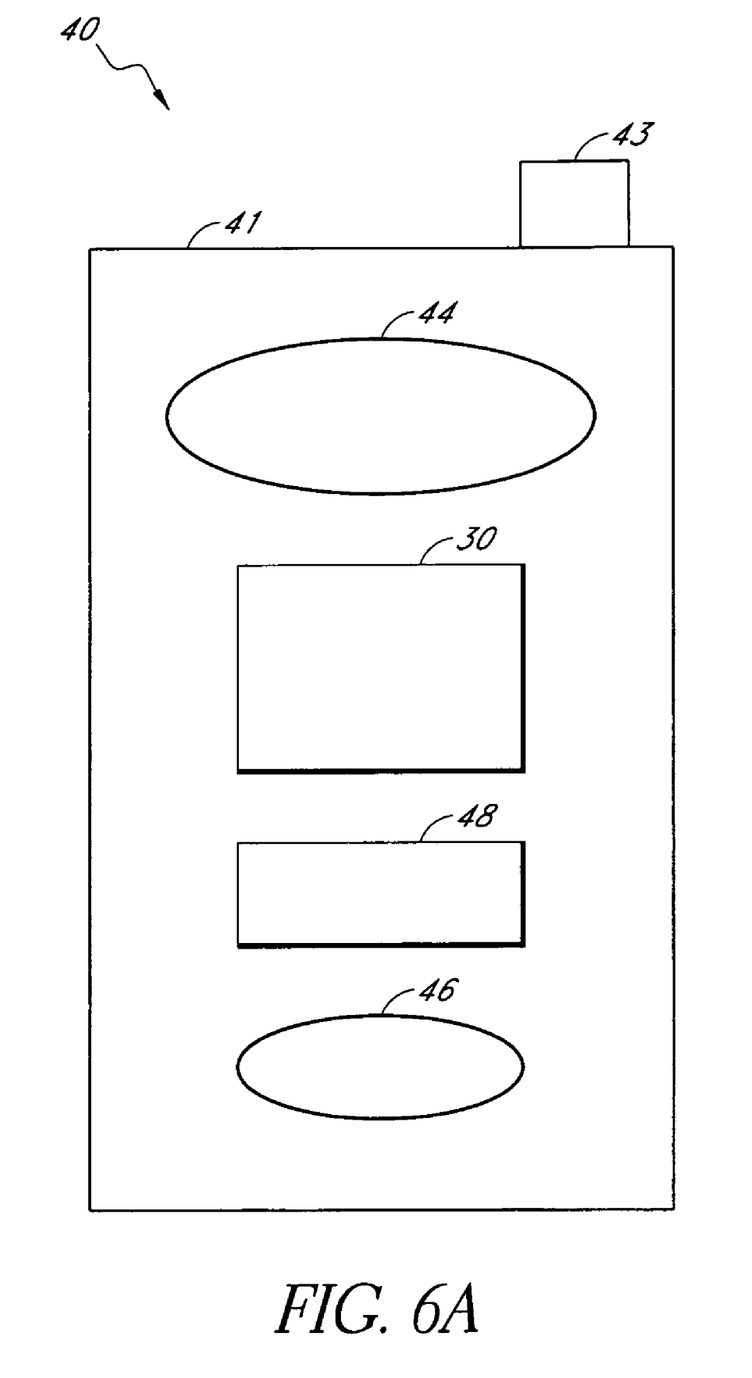
FIGS. 6A and 6B are system block diagrams illustrating an embodiment of a visual display device comprising a plurality of interferometric modulators.
Figure 6B:
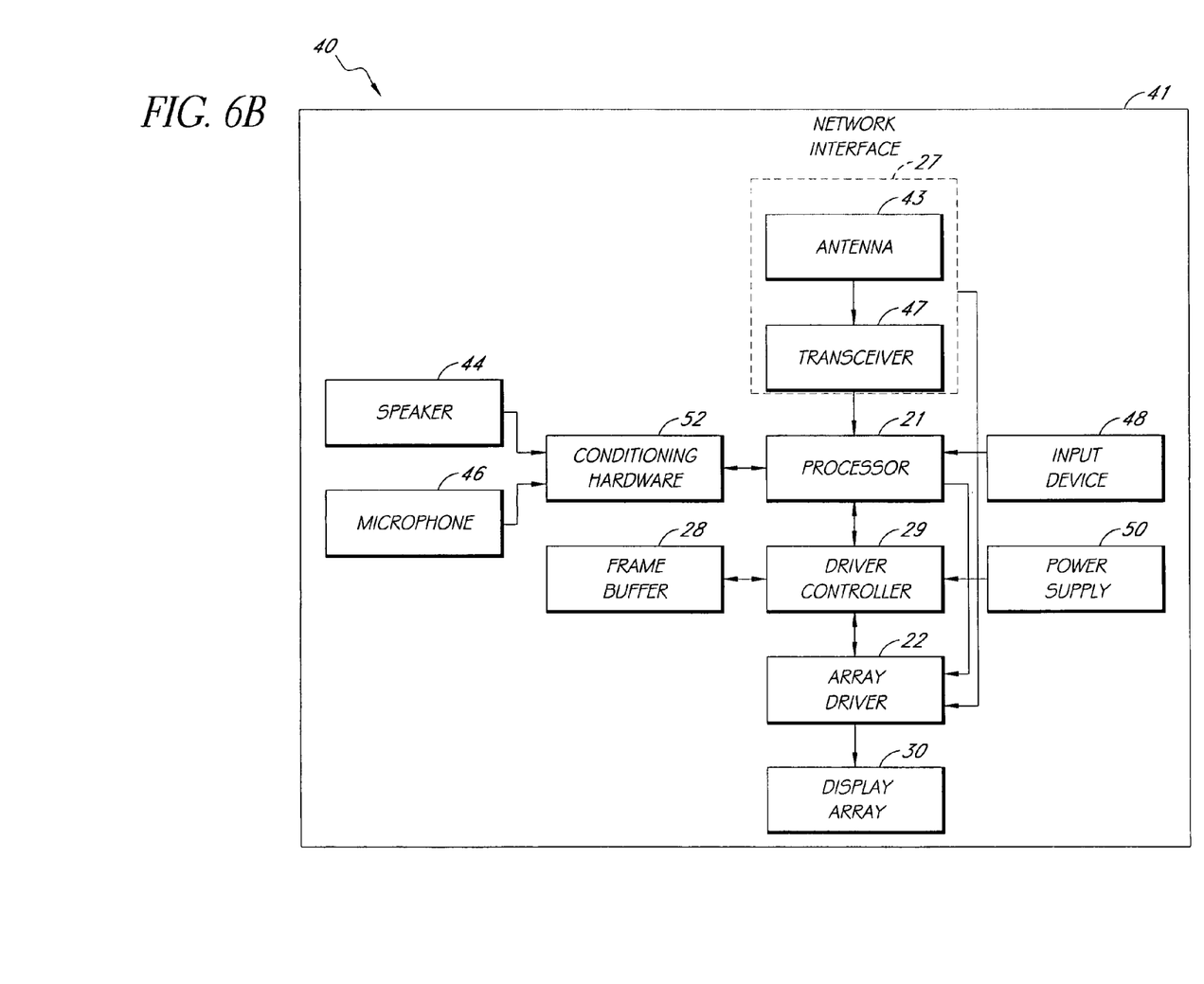

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
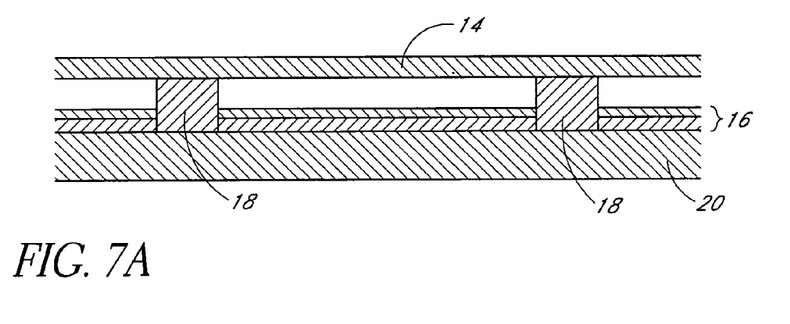
FIG. 7A is a cross section of the device of FIG. 1.
Figure 7B:
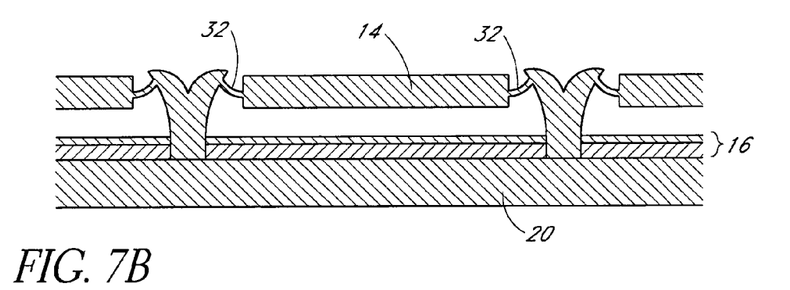
FIG. 7B is a cross section of an alternative embodiment of an interferometric modulator.
Figure 7C:
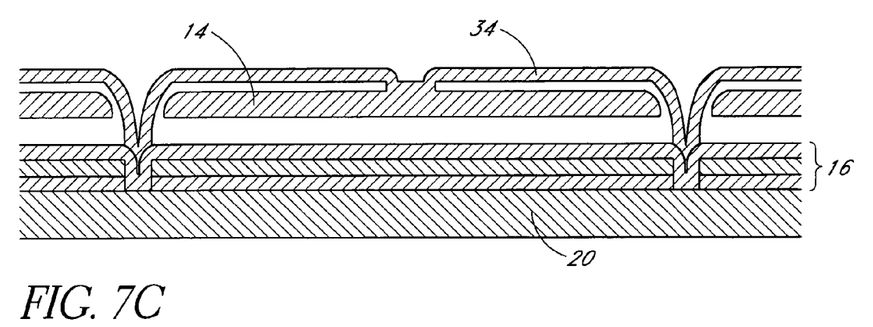
FIG. 7C is a cross section of another alternative embodiment of an interferometric modulator.
Figure 7D:
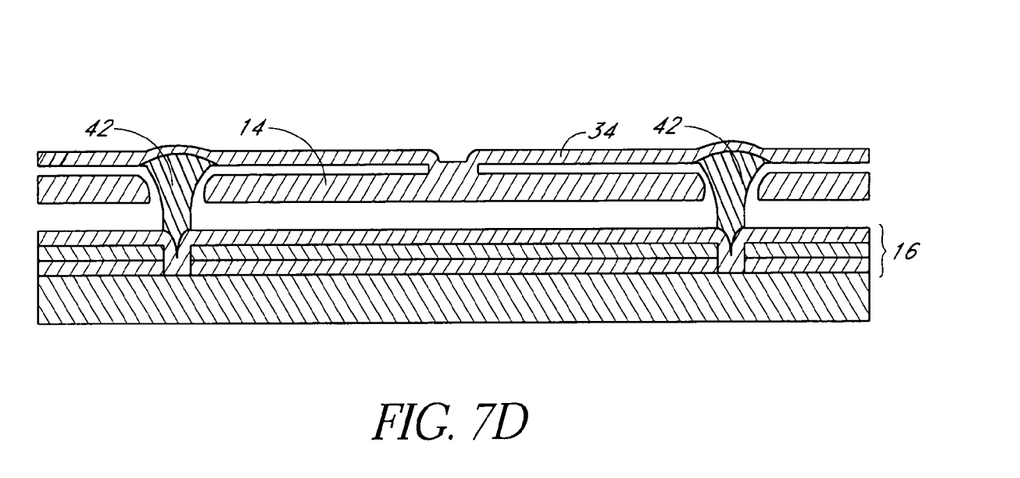
FIG. 7D is a cross section of yet another alternative embodiment of an interferometric modulator.
Figure 7E:
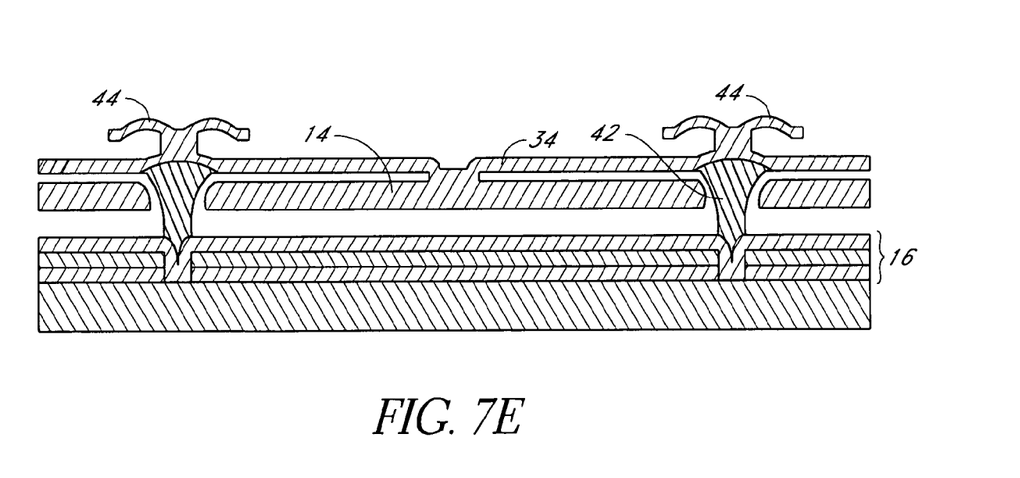
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

As discussed above, the interferometric modulators can be arranged in arrays to form a display device. The interferometric modulators can form pixels in the display device and, by modulating light reflected from an interferometric modulator, for example, by switching the interferometric modulator from a state in which the movable layer 14a, 14b and the cavity 19 are not collapsed to a state in which the movable layer 14a, 14b and the cavity 19 are collapsed, a pixel can be made to display various colors or dark or light. The time required for this switching is referred to herein as switch time.

It will be appreciated that an image on a display is typically created by updating or refreshing the state of each interferometric modulator in the display. Thus, the refresh rate is directly related to the switch time, i.e., the amount of time needed to change the state of an interferometric modulator. For this reason, display devices with high refresh rates generally provide a higher quality in comparison to display devices with a relatively lower refresh rate. Minimizing switch times of interferometric modulators is therefore desirable.

It will be appreciated that the movable layer 14a, 14b is configured to move against fluid or gas, e.g., air, in the cavity 19. The gas has a viscosity and exerts a pressure, which provides resistance against the movement of the movable layer 14a, 14b. This resistance in turn partially determines the switch time of the interferometric modulator 12a, 12b as it switches from one state to another. Thus, one embodiment of the invention is an interferometric modulator with a decreased switch time resulting from decreasing the viscosity of the gas in the cavity 19.

While the invention is not limited in theory, it has been found that the switch time for an interferometric modulator is highly dependent on the gas pressure within the interferometric modulator. Small decreases in gas pressure may result in large decreases in switch time. For example, the switch time decreases substantially as gas pressure within the interferometric modulator is lowered from atmospheric pressure to about ¼-⅛ atmospheric pressure. Accordingly, according to one embodiment, the switch time for an interferometric modulator is decreased by providing a partial vacuum in the cavity 19 to decrease the gas pressure.

Figure 8:
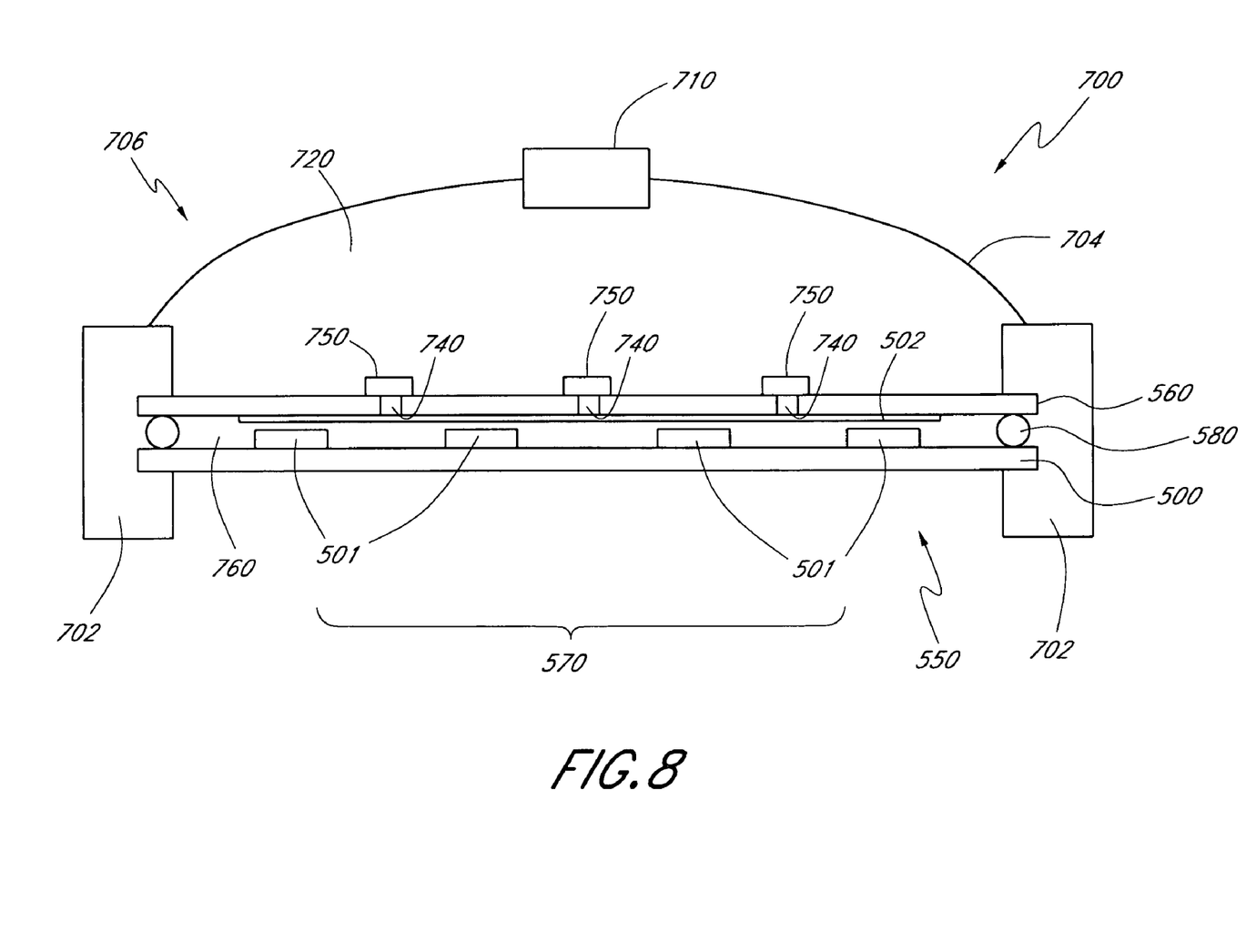
FIG. 8 is a cross section of an embodiment having a housing surrounding the panel.

FIG. 8 is a cross-sectional view of a display device 700 packaged in accordance with an embodiment. As shown in FIG. 8, interferometric modulators 501 form an array 570 in a display panel or package 550.

The interferometric modulators 501 are preferably formed on a substrate 500. The substrate 500 may be a semi-transparent or transparent substance capable of having thin film, MEMS devices built upon it. Such transparent substances include, but are not limited to, glass, plastic, and transparent polymers.

As shown in FIG. 8, a backplate 560 positioned opposite the transparent substrate 500 provides additional rigidity for the panel 550 and also protects the interferometric modulators 501 from the surrounding environment. The skilled artisan will appreciate that the backplate 560 may be formed of any suitable material, such as glass, metal, foil, polymer, plastic, ceramic, or semiconductor materials (e.g., silicon).

Perimeter supports 580 are positioned proximate the edges of the backplate 560 and serve to adhere the backplate 560 to the transparent substrate 500. In addition, the perimeter supports separate the transparent substrate 500 and the backplate 560. Preferably, the perimeter supports 580 comprise a bead of adhesive, e.g., epoxy. Other suitable materials for the perimeter supports 580 include, but are not limited to, Teflon®, metals, and polyamides. The skilled artisan will understand that, in this embodiment, the perimeter supports 580 do not necessarily need to hermetically seal the backplate 560 to the transparent substrate 500. The material for the perimeter supports 580 is preferably selected based on its outgassing properties.

A desiccant 502 can be applied to the backplate 560 to remove moisture from within the panel 550. Generally, any substance that can trap moisture while not interfering with the optical properties of the interferometric modulators 501 may be used as the desiccant material. Preferably, the desiccant 502 does not interfere with the optical properties of the interferometric modulators 501. Suitable desiccant materials include, but are not limited to, zeolites, calcium sulfate, calcium oxide, silica gel, molecular sieves, surface adsorbents, bulk adsorbents, and chemical reactants. Other desiccant materials include indicating silica gel, which is silica gel with some of its granules coated with cobalt chloride. The silica changes color as it becomes saturated with water. Calcium oxide is a material that relatively slowly absorbs water.

According to an embodiment, the panel 550 is sealed within a housing 706, preferably comprising panel supports 702 and a wall 704. The supports 702 and the wall 704 form an enclosed volume 720 that provides a substantially air-tight seal around the panel 550. As shown in FIG. 8, a vacuum device 710 generates at least a partial vacuum within the volume 720. In one example, the vacuum device 710 is a vacuum pump that connects to the housing 706 and is configured to generate at least a partial vacuum within the volume 720. The backplate 560 comprises one or more gas passages 740 in gas communication with the volume 720. It will be appreciated that the interferometric modulators 501 are formed such that the cavities therein can be in gas communication with a space 760 within the panel 550 and, ultimately, with the volume 720. Thus, a partial vacuum in the cavities within the interferometric modulators 501 can be generated by removing gas from the volume 720 using the vacuum device 710.

Advantageously, the reduced-pressure gas decreases the viscosity of the gas inside the cavities within the interferometric modulators 501, thereby decreasing the switch times for the interferometric modulators 501 and increasing the refresh rate of the display device 700. In one embodiment, the reduced gas pressure is less than about 0.85 atmospheres. In another embodiment, the reduced gas pressure is less than about 0.25 atmospheres and, in a third embodiment, the gas pressure is about 0.125 to about 0.25 atmospheres.

It will be appreciated that the gas passages 740 can optionally be provided with covers or valves 750 that open when the vacuum device 710 is engaged and that close when the vacuum device 710 is off. The covers 750 can be passive, e.g., opening in response to a pressure differential caused by generating a partial vacuum in the volume 720, or they can be active, e.g., having mechanical actuators that cause them to open or close at designated times. The covers 750 can prevent contaminants from entering the space 760 within the panel 550. In addition, in some embodiments, the vacuum device 710 is only engaged intermittently and covers 750 can be closed to maintain the pressure within the space 760 in the panel 550 during periods when the vacuum device 710 is not engaged.

In other embodiments, the housing 706 need not be substantially air-tight and the strength of the vacuum created by the vacuum device 710 is preferably increased to compensate for any air leakage into the housing 706. In addition, rather than being coupled through the volume 720, the space 760 within the panel 550 and open to the cavities within the interferometric modulators 501 can be directly connected, e.g., via the passages 740. Moreover, while illustrated as integral to the housing 706, the vacuum device 710 can be positioned at a distance from the housing 706 and connected to the housing 706 by a gas conduit (not shown).

In one embodiment, the panel 550 is not sealed within a housing 706. In this embodiment, an opening is formed (and later sealed) in the panel, preferably in the backplate 560. To create a partial vacuum in the cavities within the interferometric modulators 501, the panel 550 may be placed in a vacuum chamber so that a partial vacuum may be created by drawing gas out of the panel 550 through the opening.

The skilled artisan will understand that, according to this embodiment, the opening is preferably hermetically sealed after the partial vacuum is generated within the interferometric modulators 501 to hermetically seal the interferometric modulators having a lower gas pressure within the panel 550. It will also be understood that the perimeter supports 580 preferably comprise a hermetic seal, such as solders and welds, which are preferably formed of a tin alloy (e.g., tin lead, tin antimony). Another suitable material for creating a hermetic seal is a glass frit, which is preferably a glassy or ceramic paste that is fired after it is applied. Generally, it is desirable to minimize the permeation of water vapor into the panel 550 and thus control the environment inside the panel 550 and hermetically seal it to ensure that the environment remains constant. An example of a hermetic sealing process is disclosed in U.S. Pat. No. 6,589,625. When the humidity within the panel 550 exceeds a level beyond which surface tension from the moisture becomes higher than the restoration force of a movable element (e.g., the movable layers 14a, 14b described above) in the interferometric modulators 501, the movable element may become permanently stuck to the surface.

Alternatively, instead of placing the panel 550 in a vacuum chamber, a vacuum device, such as a vacuum pump, may be attached to the panel via the opening to generate a partial vacuum in the cavities within the interferometric modulators 501. It will be understood that in the embodiments without the housing 706, the covers 750 are not necessary.

Figure 9:
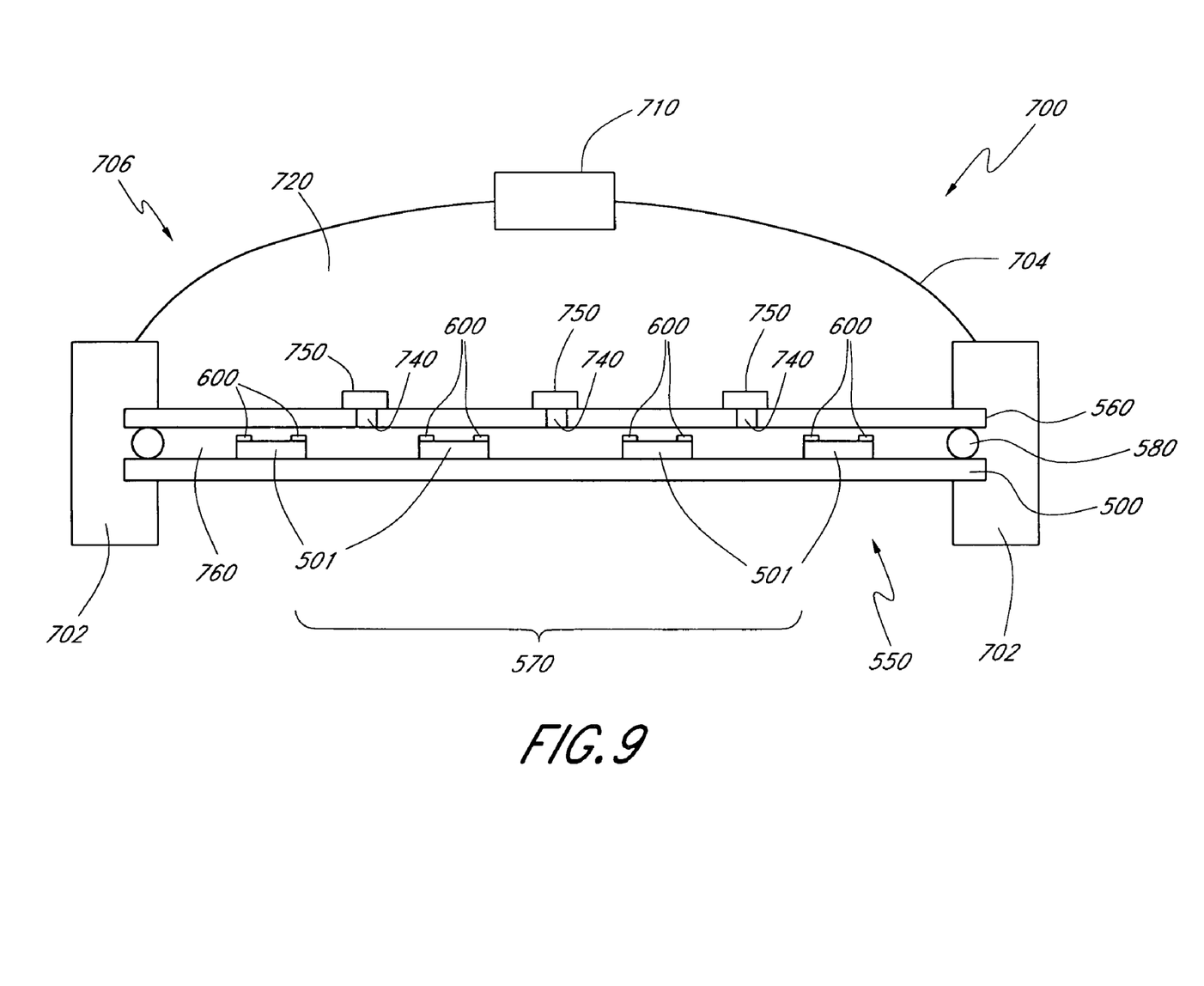
FIG. 9 is a cross section of another embodiment having a housing with and interferometric modulators with spacers.

With reference to FIG. 9, in another embodiment, the interferometric modulators 501 can be provided with protruding spacers 600, which serve to separate and protect the interferometric modulators 501 from contact with the backplate 560. Preferably, the spacers 600 are formed of a solid material that has good shape retention and is not easily compressible. Suitable materials for forming the spacers 600 include, but are not limited to, photoresist, polyamide, and metals. Thus, when the backplate 560 or transparent substrate 500 is stressed or depressed, the spacers 600 can advantageously prevent the housing 706 from contacting and damaging sensitive parts of the interferometric modulators 501, such as the movable layer (14a, 14b).

The skilled artisan will appreciate that once gas has been drawn out of the cavities of the interferometric modulators 501 and from the panel 550, it may be preferable to replace the removed gas with an inert gas, such as nitrogen or argon.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A display device, comprising:
a substrate configured to transmit light therethrough;
a modulating means for modulating light transmitted through the substrate, wherein the modulating means is formed on the substrate and has a first cavity therein, wherein the first cavity has a gas pressure less than atmospheric pressure;
a backplate sealed to the substrate to form a package; and
a vacuum housing configured to hold the package,
wherein the housing connects to a vacuum device,
wherein the vacuum device generates at least a partial vacuum within a second cavity between the housing and the package to lower gas pressure within the first cavity in the modulating means, and
wherein a valve is disposed between the first cavity and the second cavity.

2. The display device of claim 1, wherein the valve comprises at least one gas passage in communication with the second cavity.

3. The display device of claim 2, wherein the gas passage comprises a cover configured to be in an open position while the vacuum device is operating.

4. The display device of claim 3, wherein the cover is configured to open when at least a partial vacuum is generated within the second cavity.

5. The display device of claim 3, wherein the cover comprises a mechanical actuator.

6. The display device of claim 1, wherein the backplate is sealed to the substrate with a hermetic seal.

7. The display device of claim 1, wherein the modulating means comprises an interferometric modulator.

8. The display device of claim 7, wherein the interferometric modulator comprises protruding spacers attached to the interferometric modulator on the inside of the first cavity.

9. The display device of claim 1, wherein the substrate is a transparent substance.

10. The display device of claim 1, wherein the substrate comprises glass, plastic, or transparent polymers.

11. The display device of claim 1, wherein the backplate comprises glass, metal, foil, polymer, plastic, ceramic, or semiconductor material.

12. The display device of claim 1, comprising a desiccant within the package.

13. The display device of claim 12, wherein the desiccant is selected from the group consisting of zeolites, calcium sulfates, calcium oxide, silica gel, molecular sieves, surface adsorbents, bulk adsorbents, and chemical reactants.

14. The display device of claim 1, wherein the backplate is supported by a panel support.

15. The display device of claim 1, wherein the backplate is supported by a perimeter support.

16. The display device of claim 1, wherein the gas pressure generated in the first cavity is less than about 0.85 atmospheres.

17. The display device of claim 1, wherein the gas pressure generated in the first cavity is less than about 0.25 atmospheres.

18. The display device of claim 1, wherein the gas pressure generated in the first cavity is between 0.125 atmospheres and 0.25 atmospheres.

19. A display device, comprising:
a substrate configured to transmit light therethrough;
a modulating means for modulating light transmitted through the substrate, wherein the modulating means is formed on the substrate and has a first cavity therein, wherein the first cavity has a gas pressure less than atmospheric pressure; and
a backplate sealed to the substrate to form a package, the backplane comprising at least one valve,
wherein the at least one valve reduces gas pressure in the first cavity when engaged with a partial vacuum on an outside of the backplate, and
wherein the at least one valve seals the first cavity at the gas pressure less than atmospheric pressure.

20. The display device of claim 19, wherein the modulating means comprises an interferometric modulator.

21. The display device of claim 19, wherein the substrate is a transparent substance.

22. The display device of claim 19, wherein the substrate comprises glass, plastic, or transparent polymers.

23. The display device of claim 19, wherein the backplate comprises glass, metal, foil, polymer, plastic, ceramic, or semiconductor material.

* * * * *